Figure 1:
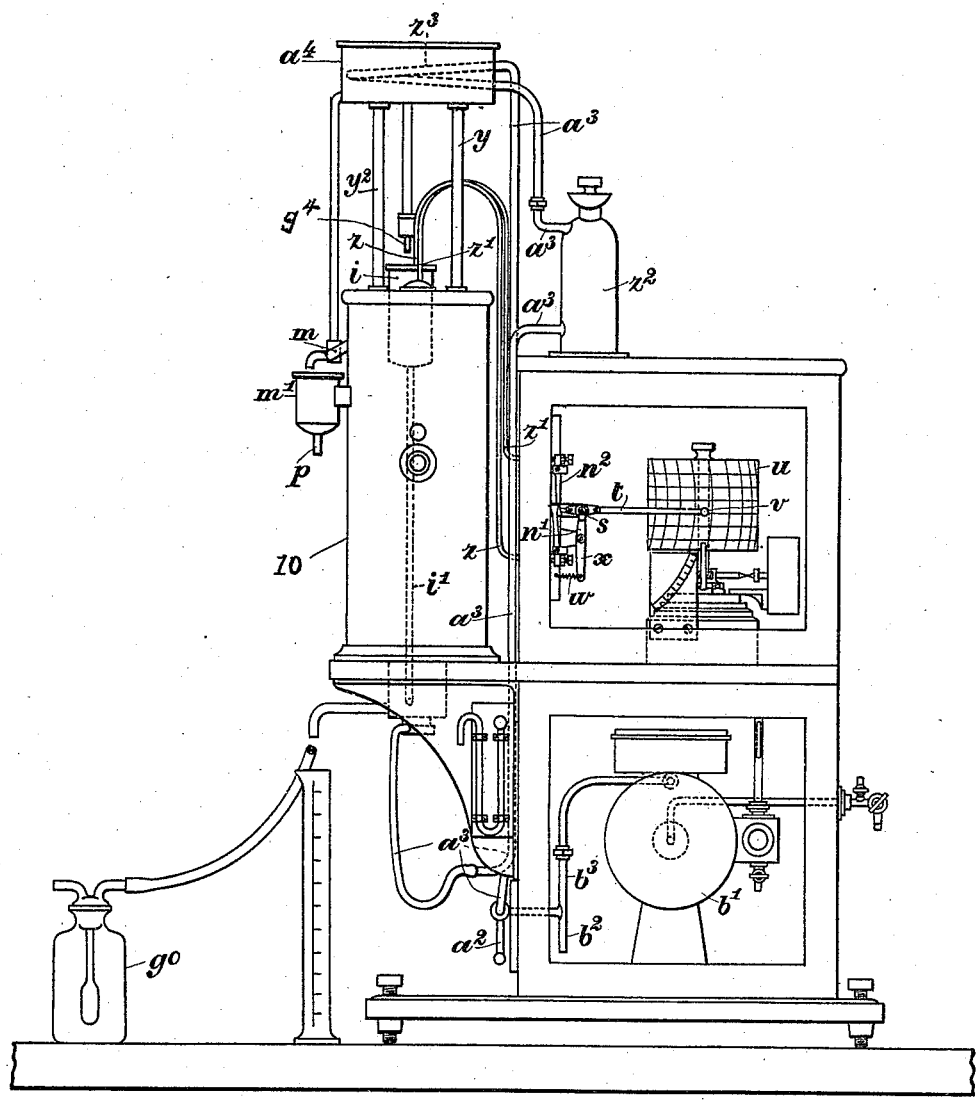

C. H. & F. G. BEASLEY & R. H. BRADBURY.
RECORDING GAS CALORIMETER.
APPLICATION FILED APR. 14, 1910.

987,537.

Patented Mar. 21, 1911.
4 SHEETS—SHEET 1.

WITNESSES

INVENTORS.
Clifford H. Beasley
Fredric G. Beasley
Richard H. Bradbury

C. H. & F. G. BEASLEY & R. H. BRADBURY.
RECORDING GAS CALORIMETER.
APPLICATION FILED APR. 14, 1910.
987,537.
Patented Mar. 21, 1911.
4 SHEETS—SHEET 2.
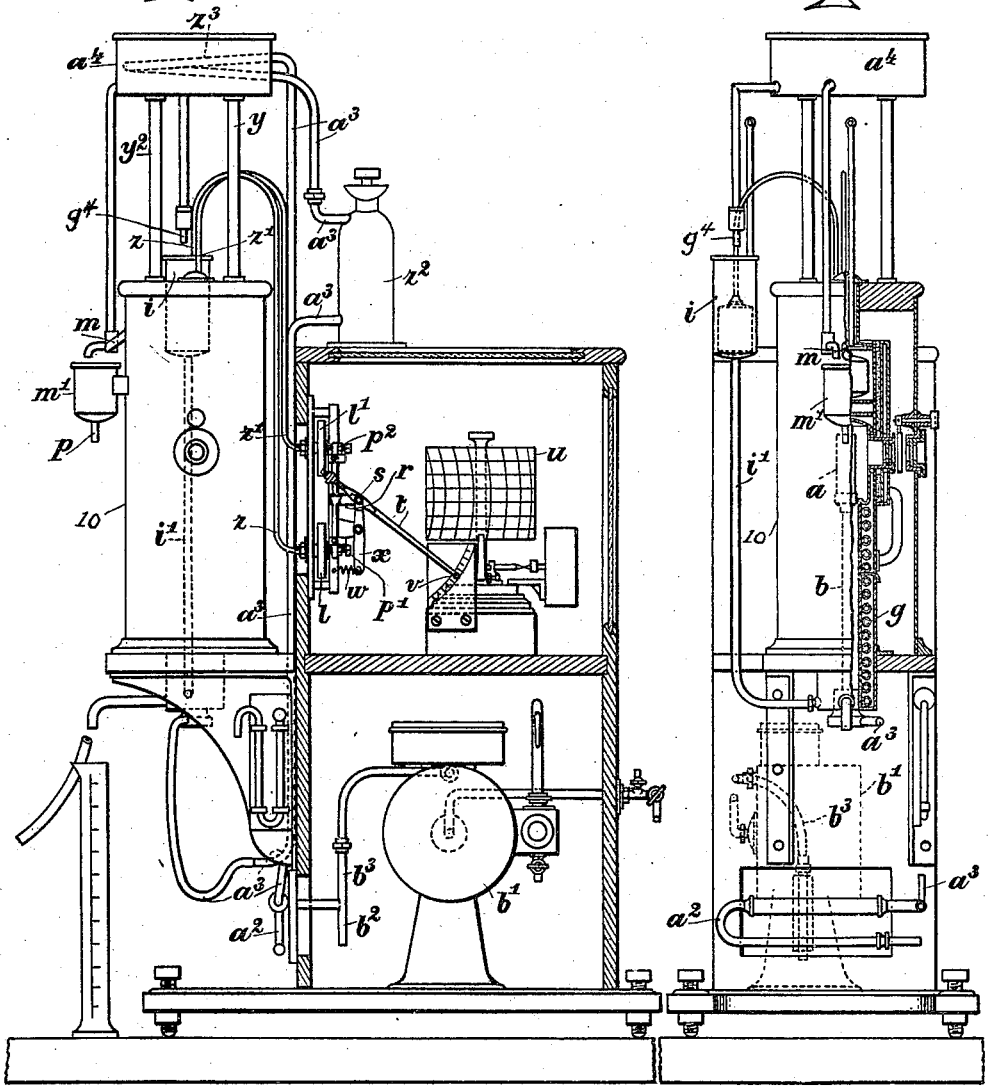

C. H. & F. G. BEASLEY & R. H. BRADBURY.
RECORDING GAS CALORIMETER.
APPLICATION FILED APR. 14, 1910.
987,537.
Patented Mar. 21, 1911.
4 SHEETS—SHEET 3.
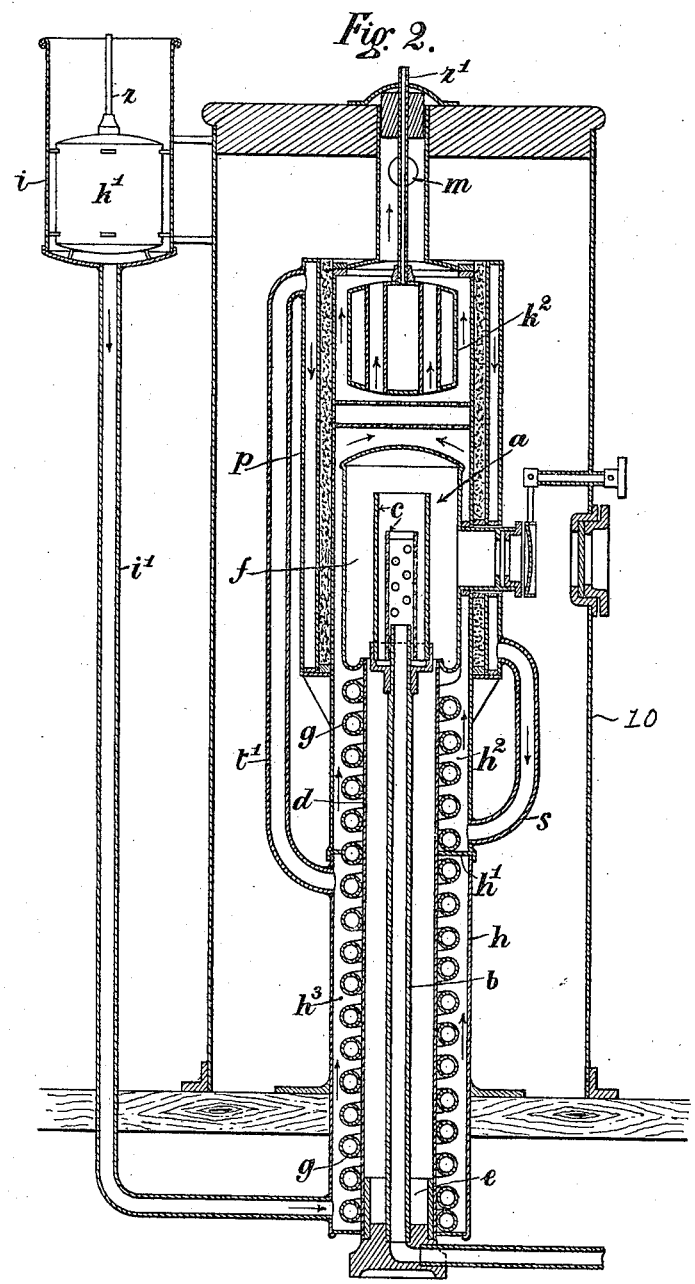

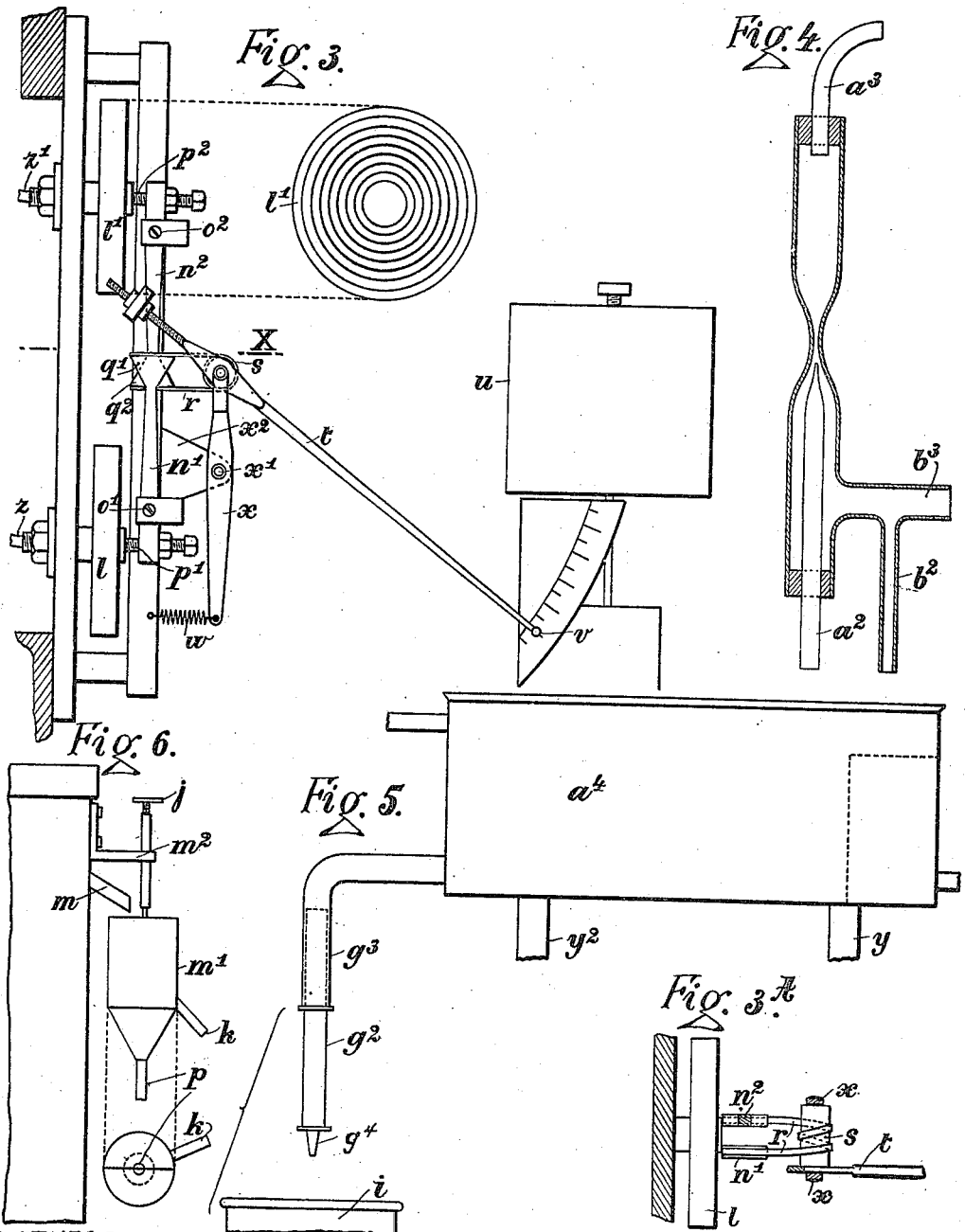

UNITED STATES PATENT OFFICE.

CLIFFORD HOWELL BEASLEY AND FREDRIC GEORGE BEASLEY, OF SMETHWICK, NEAR BIRMINGHAM, AND RICHARD HENRY BRADBURY, OF OLDBURY, ENGLAND, ASSIGNORS OF ONE-FOURTH TO PARKINSON AND W. & B. COWAN LIMITED, OF BIRMINGHAM, ENGLAND.

RECORDING GAS-CALORIMETER.

987,537.   Specification of Letters Patent.   Patented Mar. 21, 1911.

Application filed April 14, 1910.  Serial No. 555,513.

*To all whom it may concern:*

Be it known that we, CLIFFORD HOWELL BEASLEY and FREDRIC GEORGE BEASLEY, chemical engineers, both of 44 Green street, Smethwick, near Birmingham, England, and RICHARD HENRY BRADBURY, electrical engineer, of 49 Birmingham street, Oldbury, England, all subjects of the King of Great Britain, have invented certain new and useful Improvements in Recording Gas-Calorimeters, of which the following is a specification.

This invention has reference to gas calorimeters of the type in which the quantity of heat developed by the combustion of a known quantity of gas in unit time is transmitted to a continually flowing body such as water, whose consequential increase in temperature is measured differentially by means of thermometers at the points where the water enters and leaves the appliance.

According to the present invention, the calorimeter is constructed so that, in addition to providing for the expeditious and accurate estimation of the calorific value of gases, and particularly gaseous fuels, it also admits of the products of the combustion of the said gases being analytically examined during the time that a calorimetric test is being made, while all variations in the temperature of the flowing water are automatically indicated and recorded. Several other advantages are also secured, as will be hereinafter referred to, whereby increased utility and efficiency are attained.

The improved calorimeter is constructed so that the gas to be tested or examined, together with the requisite quantity of air, is forced into the instrument or appliance at a pressure considerably above the atmospheric pressure and is burned in a burner that is inclosed within a water-jacketed combustion chamber wherethrough a constantly flowing stream of water is passed or caused to circulate. This combustion chamber has only a single outlet, consisting of a pipe of suitable dimension fashioned into a coil or other suitable form and entirely contained within the water circulating chambers.

Owing to the fact that the gas is supplied and burned under pressure, the products of combustion are forced to travel downwardly through the outlet coil at a constant rate which can be readily controlled or varied as desired and are cooled within the said coil to the temperature of the water where it enters the jackets or chambers; this being effected by providing the entrance for water at the bottom of the coil jacket and compelling the same to flow through upward, or in the inverse direction to the travel of the products of combustion. Further, the fact that a pressure exceeding atmospheric pressure is maintained in the combustion chamber also provides that the burned gases, after their passage through the water-heating coil, can be forced to circulate through any suitable known form of apparatus for chemically analyzing the same, from which it follows that gases can be simultaneously, or at one operation, tested to determine both their calorific value and their combustible constituents.

To provide for measuring of the differences in the temperature of the water at the entrance to the jackets or circulating chambers and at the outlet therefrom, a differential thermometer system is employed consisting of two thermometer bulbs, each connected by a fine bore pipe to a box having a sensitive diaphragm. Each bulb with its associated box is filled with oil or other liquid susceptible to expansion and contraction under variations of temperature, and one bulb is immersed in the water at the entrance to the jacket and is under the influence of the minimum temperature while the other is immersed near the outlet where the water attains its maximum temperature by virtue of the heat taken up from the walls of the coil and combustion chamber, while in order to indicate and register or record all variations in the differences between the minimum and maximum temperatures as measured by the respective thermometers both of the sensitive diaphragms aforesaid are mechanically connected, through a system of levers, with the shiftable fulcrum of a pen-staff forming part of a recording device whereby the fluctuations are recorded on a moving band of paper, driven at a constant rate by clockwork.

The instrument also comprises an arrangement for automatically maintaining a constant rate of flow of water past the combustion chamber and heating coil, and which consists of an elevated tank wherein a constant head is maintained by the usual weir method and from which the water flows at a constant rate from a jet into a deep cup that forms the entrance to the water-circulating system and contains the bulb of the minimum thermometer while provision is also made whereby in the event of any increase of resistance to the flow of the said water through the instrument, such increase is compensated for by the head of water that builds itself up in the said deep cup.

Further, provision is made according to the invention whereby the gas and air to form the combustible mixture and the water used in making the tests can be readily brought to a uniform temperature before they pass into the instrument, which is effected by arranging within the elevated water tank, a coil of a few turns wherethrough the gas and air are forced before passing to the burner in the combustion chamber and whereby they are brought to the same temperature as the water in which the equalizing coil is immersed and which proceeds from the said tank to the jackets inclosing the combustion chamber and heating coil: While to provide for the maximum saturation of the gas and air prior to their combustion, or to bring them to the same degree of saturation as the exhaust burned gases, the said gas and air are passed through a chamber containing water which is interposed between the temperature-equalizing coil and the injector which forces the mixed air and gas under pressure into the combustion chamber. This obviates the necessity of making tests to correct the records of the instrument for humidity.

We will now proceed to more fully describe our invention and the manner of using the same with reference to the accompanying drawings, in which—

Figures 1 and 1$^A$ and 1$^B$ show a convenient general arrangement that may be adopted, and illustrate the connection between the different parts, including the gas air and water temperature equalizer, the gas and air saturator or maximum humidifier, the arrangement of the sensitive diaphragm boxes pertaining to the differential thermometer system and the mechanical means for automatically recording the fluctuations in temperature differences between the minimum and maximum thermometers. Further, Fig. 1 exemplifies the manner in which the invention provides for the analytical examination of the products of combustion and it also shows a convenient disposition of appliance for controlling the delivery of gas to the burner so as to insure the constant delivery of a given weight of gas in a given unit of time; also the arrangement for taking up the appropriate quantity of air; also the injector device whereby the gas and air are forced through the humidifier and temperature equalizer to the burner and whereby also the pressure is maintained for forcing the products of combustion through the water-heating coil and through the analysis apparatus. Fig. 2 represents, upon an enlarged scale, a sectional view showing the burner combustion chamber and water heating coil and the water jackets pertaining thereto; also the water entrance and outlet and the dispositions of the bulbs of the minimum and maximum thermometers in relation to the said entrance and outlet. Fig. 3 shows, upon an enlarged scale, the arrangement of the sensitive diaphragm boxes and the pen-staff mechanism which is actuated thereby. Fig. 3$^A$ is a detail view showing the connections for rocking the pen staff in accordance with the relative movements of the sensitive diaphragms. Fig. 4 is a diagrammatic representation of the gas and air injector device. Fig. 5 shows the elevated tank that contains the temperature-equalizing coil and whereby the constant flow of water is provided for. This view also shows a device that may be fitted for varying the pressure at the jet that delivers water into the cup containing the minimum thermometer. Fig. 6 is a diagrammatic view of an arrangement with which the instrument may be furnished to facilitate the checking of the flow of water through the instrument by the method of weighing the quantity flowing from the circulating system in a given unit time.

The same letters of reference indicate corresponding parts in the several figures of the drawings.

The body of the instrument consists of a cylindrical casing or cover 10, mounted on a suitable stand, and inclosing a cylindrical combustion chamber $f$, to which access is obtained from below the said casing by a tubular passage or shaft $d$, the lower end of which is adapted to be closed by a removable plug or stopper $e$ fixed to a pipe $b$ that carries the burner $a$. This burner, which may be of any suitable construction is mounted upon the upper end of the pipe $b$ so as to come within the middle of the combustion chamber, and it is supplied with a mixture of gas and air which is delivered by way of the said pipe. The delivery of gas to the burner is controlled by any suitable apparatus which may be arranged at $b^1$ (see the general view, Fig. 1) and operates to keep the supply constant or regular and thereby to insure that the same weight of gas shall be delivered to the burner during every unit time that the instrument is in action. And to provide for the delivery of the gas, with the appropriate quantity of air, under pressure to the burner, the quantity-controller $b^1$ is connected to an injector, (represented diagrammatically in Fig. 4) which may conveniently be mounted as shown in Fig. 1, and is operated by air forced thereinto by a pump, fan or the like at a few pounds of pressure per square inch. The resulting mixture of gas and air under pressure is ignited at the burner while the latter is outside the instrument, and when the same is in proper action, it is introduced into the combustion chamber by way of the open-bottomed shaft $d$ and it is secured in position by the stopper $e$ on the supply pipe. The said stopper also serves to close the bottom of the said shaft and prevent the escape of any of the products of combustion therefrom.

As already stated, the burner may be of any suitable construction, but the form shown in the drawings is provided with a double cylindrical mantle or shroud $c$, made of some refractory non-corrodible material, preferably silica, although other material such as fire-clay may be used. Combustion takes place within the mantle when the burner is ignited before its introduction into the instrument and the said mantle is introduced into position before being passed up into the combustion chamber.

The combustion chamber $f$ has—in the preferred construction as represented—only a single outlet consisting of a spiral or coil of relatively small bore tubing $g$, which serves as a water-heating element, but we may use any other tubular arrangement of outlet for the products of combustion, such as a number of straight tubes, although we are aware that a calorimeter has been proposed where a burner carried by a removable stopper, is inclosed in a wide tube forming a heating chamber from the head of which a series of pipes descend through a water jacket wherein water is made to flow upwardly in the opposite direction to the descending gases.

Both the combustion chamber and the spiral or other outlet from the bottom thereof are entirely inclosed in a jacket or cylinder $h$ wherethrough water is compelled to circulate at a constant rate by a device hereinafter described. This water enters the lower part of the jacket from an elevated cup $i$ by way of the inlet pipe $i^1$ and it is compelled to rise within the said jacket or flow therethrough in the inverse direction to that in which the products of combustion from the chamber $f$ are forced, by the action of the gas and air supply pressure, through the coil $g$. The result of this arrangement is that the water in passing through the jacket at constant unit quantity in unit time absorbs from the walls of the coil $g$ and combustion chamber $f$, the whole of the heat generated by the combustion of the known quantity of gas per time unit at the burner, so that the combustion products are discharged from the outlet of the coil at the temperature of the water where it enters the jacket. Thus it will be obvious that by this method of working the thermal value of the gas being tested may be accurately determined by measuring (as in methods now in general use) the difference of temperature between the water where it enters the bottom of the jacket and at the upper part where the water leaves, while to examine the products of combustion it is only necessary to couple the outlet end of the coil to ordinary gas analysis apparatus as shown in Fig. 1 and marked $g^0$.

In order to effectively insulate the upper part of the water chamber, it may be lagged as shown and surrounded by an additional water-jacket $p$, while the chamber itself is horizontally partitioned at $h^1$ into two superimposed compartments $h^2$, $h^3$ and water-circulating pipes $t^1$, $s$ and connections are arranged so that the water ascending in the lower compartment $h^3$ is diverted by way of the pipe $t^1$ into and through the pipe $s$ to the bottom of the compartment $h^2$ which contains the combustion chamber, while finally the water ascends to the top of the said compartment $h^2$ wherein it attains its maximum temperature, and is discharged at the outlet $m$.

To automatically record the differences in temperature between the water at the points of intake and discharge we propose to use an arrangement that comprises two metal spherical or cylindrical vessels $k^1$, $k^2$ constituting thermometer bulbs, one of which $k^1$ is contained within the cup $i$ where the cold water enters the instrument, so that the same is maintained at and measures the minimum temperature of the said water, while the other bulb is situated in the upper part of the water jacket $h$, just above the combustion chamber, where it is influenced by the hot water leaving the instrument and consequently measures the maximum temperature of the said water. The two thermometer bulbs are connected by fine bore tubes $z$, $z^1$ to sensitive diaphragm boxes $l$, $l'$, suitably mounted in the recording part of the instrument as shown in Figs. 1 and 3. The bulbs, connecting tubes and boxes are filled with oil or other liquid, the expansion and contraction of which under the influences of temperature variations will result in a corresponding outward or inward movement of the sensitive diaphragms. In order that these deflections may be mechanically recorded a pair of levers $n^1$, $n^2$ are fulcrumed at $o^1$, $o^2$ respectively to small brackets which are fixed to the frame of the mechanism and the short arm of each lever contacts, by means of a small adjustable pin ($p^1$, $p^2$) with the flexible face of the corresponding sensitive diaphragm box, so that one lever $n^1$ is influenced and oscillated by deflections of the diaphragm of the box $l$, caused by variations in the minimum water temperature, while the other $n^2$ is similarly influenced by the deflections of the diaphragm of the box $l'$ under variations in the maximum water temperature. The two ends $q^1$ $q^2$ of the longer arms of the said levers are coupled to one another by a bronze strip or thread $r$, the extremities of which are respectively fastened to the said lever ends while the middle part of the said strip is made to take a complete turn around a roller or rock-shaft $s$, (see the small plan Fig. $3^A$) which carries a pen staff $t$ and is mounted in the forked end of a lever $x$ having its fulcrum at $x^1$ on a small fixed bracket $x^2$. The other end of this lever $x$ is acted upon by a spring $w$ arranged as shown, whereby the connecting strip is maintained in tension and the contact screws of the diaphragm levers are kept bearing against the deflecting diaphragm faces so that they follow up the latter when they move inwardly in unison with any contraction of the liquid contents. The pen-staff which is connected to and turns in unison with the rock shaft, is furnished with a pen or marker $v$ whereby the movements of the mechanism are marked and recorded on a band of paper carried upon a clock-driven drum $u$. With this arrangement, should both diaphragms move in the same direction and to the same extent as a consequence of a common change of temperature, no turning motion will be imparted to the rock shaft and pen staff, as both the diaphragm levers will make an equal angular movement in the same direction, and when the diaphragms move outwardly the strip $r$ will act simply as a link and impart a corresponding movement to the lever $x$ for tensioning the spring $w$ to obtain a return movement of the parts when the diaphragms move inwardly. If, however, the diaphragms are influenced by different temperatures such as obtain when the calorimeter is in use, then their differential movement causes the one lever to make an angular movement relatively to the other, which movement is transmitted to the roller or rock-shaft by the tensioned strip $r$ acting like a band upon a pulley. The rocking of the roller produces a corresponding movement of the pen staff and alters the position of the marker upon the surface of the traveling paper. Thus when the instrument is in use, every movement of either of the diaphragms, produced by changes in the influencing temperatures results in a change in the position of the pen staff which vibrates in synchronism only with variations in the difference between the temperature as measured by the minimum thermometer and the temperature as measured by the maximum thermometer and these differential variations are marked by the pen and automatically recorded on the traveling paper either as temperature or corresponding thermal value.

In Fig. $1^A$, the parts of the automatic recording mechanism (including the pen-staff) are shown in their inoperative positions, while Fig. 1 shows the mechanism ready for action and after the pen staff has been lifted to bring the marker into contact with the recording paper by the movement imparted thereto by the initial outward movement of the maximum diaphragm on the water being first heated after the introduction of the burner into the combustion chamber.

As regards the injector arrangement, the high pressure air enters at $a^2$ and draws in an auxiliary supply from the atmosphere at $b^2$, while the gas enters at $b^3$, and the resulting mixture is forced to the burner as already described by way of the pipe $a^3$.

To control the flow of water through the instrument the tank $a^4$ is supported by pillars $y$ $y^2$ above the casing of the combustion chamber and a constant head of water is maintained therein by the usual weir method. The water is delivered from the said tank through a jet $g^4$ (which is preferably silica although glass may be used) into the inlet cup $i$. Providing a constant stream flows from the jet $g^4$, the quantity of water passing through the instrument in unit time will be unaffected by any slight variation of resistance to its flow, as this is automatically compensated for by the head that builds itself up in the cup $i$. In other words, the flow from the jet is independent of the resistance to flow through the instrument. Provision is made for adjusting the rate of flow through the jet, consisting of a tube $g^2$ capable of telescoping into the tube $g^3$ through a water-tight gland. The tube $g^2$ carries the jet $g^4$, and the head of water in the tank $a^4$ above the jet can be varied at will by sliding the tube $g^2$ in or out of the tube $g^3$.

The means for facilitating the checking of the rate of water flow involves the arrangement of the outlet pipe $m$ of the water circulating system to terminate just above a cup $m^1$, which is rotatably mounted outside the casing on a bracket $m^2$, and is divided into two compartments vertically. By rotating the cup about its vertical axis, either of the compartments can be brought under the outlet pipe $m$. One compartment of the cup is permanently connected to a flexible waste pipe $k$, while the other has a funnel-like outlet $p$, through which water may be run from the cup into a receiver suitable for weighing. Normally, the waste compartment of the cup is under the outlet and the discharged water runs thence to a sink or the like, but when it is desired to check the rate of flow per time unit by weighing the quantity discharged at the outlet in a given time, this can be readily done by giving the cup a smart quarter turn by the milled nut $j$, so as to bring the other compartment under the outlet. The stream of water is thus diverted or switched from the pipe $m$ to the weighing vessel and this enables an accurate measurement to be made as to the quantity of water flowing through the instrument relative to time.

The vessel containing water for humidifying the gas and air supply to saturation is marked $z^2$ in Fig. 1, and the temperature equalizing coil whereby air, gas and water are all brought to the same temperature before entering the instrument is indicated by dotted lines $z^3$ in the elevated tank $a^4$.

Having fully described our invention, what we desire to claim and secure by Letters Patent is:—

1. In a gas calorimeter, in combination, a burner, a closed shaft inclosing the burner, a burner connection which passes through the shaft, the latter having a combustion chamber in which the burner is arranged, water heating tubes through which the products of combustion are forced from said chamber, and means for supplying air and gas under pressure considerably greater than atmospheric pressure to the burner, the air and gas thus supplied serving to force the products of combustion through said tubes.

2. In a gas calorimeter, in combination, a burner, a closed shaft inclosing the burner, a burner connection which passes through the shaft, the latter having a combustion chamber in which the burner is arranged, water heating tubes through which the products of combustion are forced from said chamber, and an injector connected with a gas supply and with the connection aforesaid for maintaining a pressure supply of gas and air to the inclosed burner and forcing the resulting products of combustion through the water heater.

3. In a gas calorimeter, the combination with a water-jacketed combustion chamber and means for maintaining a pressure gas and air supply, of a high-pressure burner which is inclosed in the said chamber and consists of a double mantle or shroud made of a non-corrodible refractory material, substantially as described.

4. In a gas calorimeter, in combination, a closed shaft having a combustion chamber, a burner arranged in the combustion chamber, a burner connection passed through the shaft, means for forcing air and gas under pressure considerably greater than atmospheric pressure through the connection to the burner, water heating tubes leading from the combustion chamber on the outside of the shaft, a water jacket surrounding the tubes, and means for causing a circulation of water through the jacket in a direction opposite to the direction in which the products of combustion pass through the tubes.

5. In a gas calorimeter, in combination, a closed shaft having a combustion chamber, a burner arranged in the combustion chamber, a burner connection passed through the shaft, means for forcing air and gas under pressure considerably greater than atmospheric pressure through the connection to the burner, a water heating coil leading from the combustion chamber, surrounding the shaft, and through which the products of combustion are forced from said chamber, a water jacket surrounding the combustion chamber and the coil, and means for causing a circulation of water through the jacket in a direction opposite to the direction in which the products of combustion pass through the coil.

6. In a gas calorimeter, the combination with the water-jacketed combustion chamber and its outlet coil, of a shaft arranged within the said coil, a burner which is introduced into and removed from the chamber through the shaft, a stopper adapted to close the shaft and prevent the escape of the products of combustion therefrom when the instrument is in use and a burner supply tube carried by the stopper, substantially as described.

7. In a gas calorimeter, the combination with a combustion chamber, a burner arranged therein and an injector for supplying gas and air to the burner, of means for humidifying the gas and air to saturation, the means consisting of a humidifying vessel interposed between the injector and the combustion chamber and connected with the gas and air supply.

8. In a gas calorimeter; the combination with a water-jacketed combustion chamber and a burner arranged therein of an elevated water-supply tank, a temperature-equalizing coil arranged therein and through which the gas and air is forced before it is passed to the burner and connections between the coil and the burner, substantially as described.

9. In a gas calorimeter; the combination with a water-jacketed combustion chamber and an elevated water tank in which a constant head of water is maintained, of an outlet pipe discharging from said tank, a pipe leading into the jacket and carrying a deep cup into which the outlet cup discharges; the said cup being adapted to provide for the automatic building up of a head of water therein in the event of any increase of the resistance to the flow of water through the instrument and hence rendering the flow from the outlet pipe independent of such resistance, substantially as described.

10. In a gas calorimeter; the combination with a combustion chamber having a water jacket and an outlet for the latter, of a rotatable cup divided vertically into two compartments, one of which is connected with the waste and the other of which is adapted to divert the water into a weighing vessel; the cup being arranged to receive water from the outlet.

11. In a recording gas calorimeter; the combination with minimum and maximum thermometers and their associated sensitive diaphragm boxes, of a pair of levers contacting respectively with the sensitive diaphragms of the boxes, an indicating and recording instrument having a pen staff, a rock shaft carrying the pen staff and a tensioned thread of metal which is passed around the rock shaft and which has its extremities connected to the respective levers, substantially as and for the purpose described.

12. In a gas calorimeter, in combination, a combustion chamber, a burner arranged therein, a coil leading from the combustion chamber, a water jacket surrounding the coil, means for causing a circulation of water through the jacket, means for delivering air and gas to the burner, and means for equalizing the temperature of the air and gas prior to its passage to the burner to the temperature of the water prior to its circulation through the jacket.

In testimony whereof we have hereunto set our hands in presence of two subscribing witnesses.

CLIFFORD HOWELL BEASLEY.
FREDRIC GEORGE BEASLEY.
RICHARD HENRY BRADBURY.

Witnesses:
HENRY SKERRETT,
HENRY NORTON SKERRETT.

Copies of this patent may be obtained for five cents each, by addressing the "Commissioner of Patents, Washington, D. C."